US010442502B2

(12) United States Patent
Norrman

(10) Patent No.: US 10,442,502 B2
(45) Date of Patent: Oct. 15, 2019

(54) SHOCK ABSORBING ARRANGEMENT CONFIGURED TO WITHSTAND IMPACT SHOCK

(71) Applicant: SAAB AB, Linkoeping (SE)

(72) Inventor: Bernt Norrman, Goeteborg (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/062,294

(22) PCT Filed: Dec. 16, 2015

(86) PCT No.: PCT/SE2015/051355
§ 371 (c)(1),
(2) Date: Jun. 14, 2018

(87) PCT Pub. No.: WO2017/105303
PCT Pub. Date: Jun. 22, 2017

(65) Prior Publication Data
US 2018/0370602 A1    Dec. 27, 2018

(51) Int. Cl.
*F16F 3/00*    (2006.01)
*B63B 17/00*    (2006.01)
(Continued)

(52) U.S. Cl.
CPC ............ *B63B 17/0081* (2013.01); *B63B 3/10* (2013.01); *B63G 9/00* (2013.01); *F16F 3/02* (2013.01);
(Continued)

(58) Field of Classification Search
CPC ...... F16F 1/04; F16F 1/12; F16F 1/125; F16F 1/3665
(Continued)

(56) References Cited

U.S. PATENT DOCUMENTS

| 2,631,841 A | 3/1953 | Tillou et al. |
| 2,678,796 A | 5/1954 | Roy |

(Continued)

FOREIGN PATENT DOCUMENTS

| DE | 2320549 A1 | 11/1974 |
| DE | 2623929 A1 | 12/1977 |

(Continued)

OTHER PUBLICATIONS

International Preliminary Examining Authority (IPEA), International Preliminary Report on Patentability, including Applicant's Jan. 17, 2018 response to the IPEA's Nov. 23, 2017 Written Opinion, for International Application No. PCT/SE2015/051355, Mar. 23, 2018, 12 pages, Swedish Patent and Registration Office, Sweden.

(Continued)

*Primary Examiner* — Steven M Marsh
(74) *Attorney, Agent, or Firm* — Alston & Bird LLP

(57) ABSTRACT

The present disclosure relates to a shock absorbing arrangement suitable e.g. for ship installed structures comprising a rod, a resilient member arranged in connection to the rod, a structure element and a locking member arranged in connection to the structure element. The locking member is arranged to detachably lock the structure element at a resting position at the rod and the locking member, or the structure element, is supported by the resilient member. The resilient member is configured such that a spring force of the resilient member acts to maintain the structure element essentially at the resting position at the rod. The locking member is further configured to release the structure element from the resting position when being exposed to a force exceeding a predetermined holding force, whereupon the resilient member acts to reinstate the locking of the structure element at the resting position at the rod. The present disclosure further (Continued)

relates to a shock absorbing structure comprising such shock absorbing arrangements.

20 Claims, 6 Drawing Sheets

(51) Int. Cl.
*B63B 3/10* (2006.01)
*B63G 9/00* (2006.01)
*F16F 15/067* (2006.01)
*F16F 3/04* (2006.01)
*F16F 3/02* (2006.01)
*F16F 15/04* (2006.01)

(52) U.S. Cl.
CPC ............... *F16F 3/04* (2013.01); *F16F 15/04* (2013.01); *F16F 15/067* (2013.01); *F16F 2230/0041* (2013.01)

(58) Field of Classification Search
USPC ....... 248/560, 562, 565, 594, 613, 654, 655; 267/166, 167
See application file for complete search history.

(56) References Cited

U.S. PATENT DOCUMENTS

| 3,856,242 | A | | 12/1974 | Cook | |
|---|---|---|---|---|---|
| 3,895,788 | A | | 7/1975 | Liesegang | |
| 4,362,287 | A | * | 12/1982 | Grongstad | B63B 29/12 248/563 |
| 4,613,119 | A | * | 9/1986 | Hardtke | F16L 3/2056 248/613 |
| 5,018,700 | A | * | 5/1991 | Hardtke | F16L 3/2056 248/571 |
| 6,702,267 | B2 | * | 3/2004 | Schleinitz | F16F 1/126 248/562 |
| 7,175,150 | B2 | * | 2/2007 | Chi | F16F 3/10 248/562 |
| 7,744,050 | B2 | * | 6/2010 | de Toledo | A47L 15/4253 248/188.3 |
| 8,430,426 | B2 | * | 4/2013 | Rasset | B60R 21/131 180/89.13 |
| 2003/0075407 | A1 | | 4/2003 | Taylor | |

FOREIGN PATENT DOCUMENTS

| DE | 10205788 | A1 | 8/2003 |
|---|---|---|---|
| DE | 10236514 | A1 | 3/2004 |
| EP | 0015118 | A1 | 9/1980 |
| EP | 2325522 | A1 | 5/2011 |
| FR | 2217618 | A1 | 9/1974 |

OTHER PUBLICATIONS

International Searching Authority, International Search Report and Written Opinion for International Application No. PCT/SE2015/051355, Aug, 31, 2016, 13 pages, Swedish Patent and Registration Office, Sweden.

International Preliminary Examining Authority, Written Opinion for International Apllication No. PCT/SE2015/051355, Nov. 23, 2017, 4 pages, Swedish Patent and Registration Office, Sweden.

European Patent Office, European Extended Search Report for European Patent Application No. 15910860.4, Jun. 17, 2019, (7 pages), Stockholm, Sweden.

* cited by examiner

SHOCK ABSORBING ARRANGEMENT CONFIGURED TO WITHSTAND IMPACT SHOCK

CROSS REFERENCE TO RELATED APPLICATIONS

This application is a National Stage Application, filed under 35 U.S.C. § 371, of International Application No. PCT/SE2015/051355, filed Dec. 16, 2015; the contents of which are hereby incorporated by reference in their entirety.

BACKGROUND

Related Field

The present disclosure refers to a shock absorbing arrangement configured to withstand impact shock. The shock absorbing arrangement may e.g. be applied in order to protect sensitive, ship installed equipment such as radar antennas from impact shock caused by mine detonations at sea. Although the shock absorbing arrangement will be described with respect to a ship installed radar antenna, the disclosure is not restricted to this particular implementation but may also be used in other applications where protection of sensitive devices against impact shock or like is required. The present invention further relates to a shock absorbing structure comprising such shock absorbing arrangement.

Description of Related Art

Reliable and accurate radar functionality is essential for the operability of warships as well as for other military applications. In order for a radar device to compensate for the movements of e.g. the warship on which the radar antenna is rigidly arranged the fixed position of the radar and input from a gyro may be used. Even the smallest dislocation of a radar antenna from a presumed fix position will cause a significant deviation over distance and impair accuracy and functionality of the radar significantly, in worst case making the radar inoperable. Failure of the radar functionality of e.g. a warship might have disastrous consequences.

Thus, for radar antennas and also other highly sensitive equipment, where high accuracy is extremely important, even the smallest dislocation may be problematic and should be avoided by all possible means. This may be a problem e.g. for ship installed equipment where extremely rough sea and deliberate or unintentional mine detonations exposes such equipment for extremely high acceleration force, herein referred to as impact shock. Such impact shock may affect mechanical installations and thereby dislocate devices or equipment.

Radar antennas are generally arranged to ships by means of turntables, wherein the turntables may be mechanically rotatable and thereby e.g. providing the possibility to mechanically rotate or direct the radar antenna by means of a motor.

Current impact shock absorbing solutions often use complex systems relying on e.g. delicate hydraulic or pneumatic solutions and complex control algorithms. Such solutions are often costly, add significant weight and/or are bulky and are often not sufficiently robust for the rough conditions such installations may be exposed to.

Thus, there is a need of further improvements.

The requirement of extremely high accuracy and to the outmost avoiding even the smallest physical dislocation apply naturally also to other functionalities such as e.g. sensors and transceivers and also to other vehicle applications than warships.

BRIEF SUMMARY

With the above background in mind, then an object of the present disclosure is to provide an improved solution of how to arrange sensitive equipment and devices to structures which may be exposed to high acceleration forces or impact shocks, particularly to provide an improved shock absorbing arrangement applicable e.g. for radar antenna turntables. The present disclosure seeks to mitigate, alleviate, or eliminate one or more of the problems and deficiencies with current solutions.

The present disclosure is defined by the appended independent claims. Various exemplary aspects of the disclosure are set forth by the appended dependent claims as well as by the following description and the accompanying drawings.

According to the present disclosure a shock absorbing arrangement for ship installed structures comprises
  a rod,
  a resilient member arranged in connection to the rod,
  a structure element, and
  a locking member arranged in connection to the structure element.

The rod is preferably in form of a solid or hollow pole or screw. The resilient member arranged in connection to the rod may e.g. be in form of a spring or like. The structure element is defined as the structure at which the functionality that should be protected from impact shock is arranged, such as the turntable of a radar antenna, an assembly plate or like. The locking member may either be separate parts together forming a locking member or be interacting parts of e.g. the rod and structure element configured to together forming a locking member. In addition to the advantageous embodiments of locking members disclosed herein the locking member may be configured according to various other embodiments. Other, not herein explicitly disclosed, embodiments of locking members are also considered to be within the scope of the present disclosure.

Further, according to the present invention the locking member is arranged to detachably lock the structure element at a resting position at the rod. The resting position is defining the position of the structure element during normal operation of the functionality the shock absorbing arrangement is provided to protect, such as the position the turntable of a radar antenna has during normal operation of the radar. A part of the locking member or the structure element, or a part of the locking member and the structure element, is supported by the resilient member. The resilient member is configured such that a spring force of the resilient member acts to maintain the structure element essentially at the resting position at the rod. If the locking member, the structure element or both are supported by the resilient member is, from this perspective, irrelevant since the locking member is connected to the structure element and a force acting on the locking member also acts on the structure element and vice versa. The resilient member is either arranged to support a part of the locking member and/or the structure element, whereby the resilient member only can exert a pushing spring force on the locking member and/or structure element, or the resilient member is fixed to the locking member and/or structure element, whereby the resilient member may either exert a pushing or a pulling spring force, depending on the configuration of the resilient member present, on the locking member and/or structure element. This will be explained more in detail in the following detailed description. The locking member is configured to release the structure element from the resting position when being exposed to a force, such as an acceleration force, herein also referred to impact shock, exceeding a predetermined holding force of the locking member. When the structure element is released from the resting position the structure element, connected to the locking member, may move freely up and down along the rod by the influence of the resilient member and the spring force the resilient member is exposing the structure element and locking member to. The resilient member will then act to reinstate the locking of the structure element at the resting position at the rod. When the locking member is exposed to no force, or a force lower than the predetermined holding force the structure element is maintained at the resting position.

The shock absorbing arrangement of the present disclosure is advantageous when a structure element, such as a ship installed turntable of a radar antenna—an exemplary implementation of the shock absorbing arrangement which hereinafter will be used in order to clearly explain exemplary aspects of the disclosure and the exemplary advantages of such exemplary aspects—is exposed to a sudden force. The sudden force may e.g. be the force the radar antenna, and thereby the turntable the radar antenna is arranged to, is exposed to when a mine detonate in the vicinity of the ship the turntable is arranged to. Such acceleration force may also arise due to other events, such as extremely rough weather. For other vehicles than ships acceleration forces may arise in other situations or due to other events.

When the acceleration force exceeds the predetermined holding force the locking member is configured such that the structure element is released from the resting position. The resilient member supporting the structure element and/or locking member, wherein at least a part of the locking member is arranged to the structure element, will be able to absorb the force the structure element is exposed to. Thereby the acceleration force e.g. a radar antenna installation is exposed to will be eliminated, or at least significantly reduced, and thereby dislocation or other damage of any of the structures involved is prevented.

When the acceleration force has been absorbed, and the remaining force acting on the structure element is lower than the spring force exerted by the resilient member, the resilient member will act to reinstate the structure element at the resting position.

The predetermined holding force is preferably determined such that below the predetermined holding force, preferably by adding a safety margin, there is no or negligible risk that the structures involved may be affected or damaged, and that there thereby is no risk of dislocation, considering the structures involved. Structures is herein defined as any braces, fasteners, mounting plates, brackets, mountings etc. that are used to build up the concerned construction, such as the radar arrangement.

As the locking member releases the structural element from the resting position at the rod the structural element may move up and down along the rod. Thus, it is advantageous that the resilient member is arranged to absorb movements or forces in both longitudinal directions of the rod. This can be achiever either by that one resilient member can absorb movements in two directions or by that two resilient sub-members are used, wherein each resilient sub-member is arranged to at least absorb forces in one direction. Thus, according to one exemplary aspect of the present disclosure of a shock absorbing arrangement the resilient member comprises a first and a second resilient sub-member. The first resilient sub-member is configured to exert a spring force on a part of the locking member or on the structure element in a first longitudinal direction of the rod and the second resilient sub-member is configured to exert a spring force on a part of the locking member or on the structure element in a second longitudinal direction of the rod. The first longitudinal direction of the rod is directed essentially opposite the second longitudinal direction of the rod. Having two resilient sub-members may give better force absorbing properties than may be obtained by using just one resilient member.

As previously mentioned, according to another exemplary aspect of the present disclosure the rod extends through the first and second resilient sub-members and through the locking member, wherein the first resilient sub-member is arranged on a first side of the locking member and the second resilient sub-member is arranged on a second side of the locking member. Arrangements wherein the rod extends through the first and second resilient members has the advantage that the direction of the spring force exerted by the first and second resilient sub-members respectively will be essentially aligned with the extension of the rod wherein no bending forces will be formed acting to bend the rod. This may prolong the lifetime of the shock absorbing arrangement. However, according to yet another aspect of the present disclosure the resilient member may be arranged on the side of the rod. In such arrangement the resilient member can more easily be replaced.

According to yet an exemplary aspect of the present disclosure the locking member comprises a first locking member part and a second locking member part. The first and second locking member parts are configured to detachably lock to one another and to release from one another when being exposed to a force exceeding the predetermined holding force and acting to separate the first locking member part from the second locking member part.

According to yet another exemplary aspect of the present disclosure the first locking member part comprises a locking protrusion and the second locking member part comprises a locking groove. The rod is provided with the locking groove and the structure element is provided with the locking protrusion via the second locking member part. Further, the locking protrusion is adapted according to the locking groove. The locking groove of the locking member may either be in form of a groove formed in the rod or in from of a part of the locking member, wherein that part is arranged to the rod. The locking protrusion of the locking member may be a protruding part of the locking member arranged to the structure element. The locking protrusion is further configured to fit in the locking groove and the configuration of the locking protrusion and of the locking groove determines the interaction between the locking protrusion and the locking groove. The interaction between the locking protrusion and the locking groove determines the holding force provided by the locking member, thus the predetermined holding force which needs to be applied in order for the structure element to be released from the resting position at the rod. This will be disclosed more in detail in the detailed description.

According to another exemplary aspect of the present disclosure the locking member is in form of a ring arranged in or to the structure element, wherein the ring is configured to encircle the rod. Thereby the locking protrusion may also be in form of a ring and the locking groove may be in form of a circumferential groove wherein the ring shaped locking protrusion is configured to interact with the circumferential locking groove all around the rod.

According to one exemplary aspect of the present disclosure at least one of the first or second locking member parts is made of a resilient material. According to yet one aspect the locking protrusion of the second locking member part is made of a resilient material.

Further, according to an exemplary aspect of the present disclosure at least one end of the rod is provided with a screw threading. The screw threading is configured such when the shock absorbing arrangement is mounted at a structure, such as a turntable of a radar antenna, the screw threading interacts with a corresponding screw threading receiver of the structure. The screw threading, and the screw threading receiver the screw-threading is arranged into, is configured such that the screw threading may be more screwed into the screw threading receiver than is necessary from a mounting perspective. Thus, how deep into the screw-threading receiver the screw-threading is screwed can be controlled. Thereby, by means of screwing the screw threading of the rod into the screw threading receiver the position of the locking groove of the rod in relation to the structure is adjustable. This has the advantage that the resting position of the structure element at the rod, and thereby the normal operation position of whatever functionality that is arranged to the structure element, can be adjusted.

According to one aspect of the present disclosure, where at least one end of the rod is provided with an outer screw threading, the shock absorbing arrangement additionally comprises a clearance control arrangement. The clearance control arrangement comprises an inwardly and outwardly threaded sleeve screw. The outwardly directed screw threading of the sleeve screw interacts with a screw threading receiver of the surrounding structure, and an interacting sleeve screw nut. The inner screw threading of the sleeve screw interacts with the screw threading of the rod. The rod extends through the sleeve screw and the interacting sleeve crew nut. By controlling to what extent the sleeve screw is screwed onto the threaded end of the rod, to what extent the sleeve screw is screwed into the screw threading receiver of the surrounding structure and to what extent the sleeve screw nut is screwed onto the sleeve screw a clearance and/or preloaded spring tension of the resilient member can be controlled. The clearance control arrangement has the advantage that it is possible to control that there is no play between the resilient member and the surfaces the resilient member supports. Also, if the resilient member is non-linear the spring tension of the resilient member may be adapted according to a predetermined load condition. By controlling the spring tension of the resilient member it may be possible to influence the properties of the resilient member, and thereby the force absorbing properties and the magnitude of forces the resilient member is configured to withstand, in accordance to current conditions. E.g. a change of the weight of the radar antenna, by adding of an additional functionality, arranged to a turntable may require that the resilient members are configured differently.

According to exemplary aspects of the present disclosure of the resilient members, or at least one of the resilient sub-members, may be in form of a coil spring, a tension spring or a leaf spring. What type of spring that is most suitable for a specific implementation is considered to be commonly known. Depending on if the resilient member/resilient sub-member is attached to the locking member and/or locking member, or is just provided to for support, may the absorbing effect of the resilient member/resilient sub-member be directed in just one direction or in two directions.

As previously stated, according to a preferred aspect of the present disclosure the structure element is a turntable, e.g. configured to mechanically rotate a radar antenna of a ship.

Please not that in order for a shock absorbing structure, such as e.g. a turntable, to implement shock absorbing arrangements for protecting e.g. a radar antenna of impact shock it is not sufficient that one shock absorbing arrangement according to any of the exemplary aspects disclosed herein is used. As is apparent a number of shock absorbing arrangements needs to be implemented in order for the shock absorbing structure to be able to absorb forces. Thus, according to a first exemplary aspect of a shock absorbing structure, wherein the shock absorbing structure has a circular outer perimeter, the shock absorbing structure comprises at least three shock absorbing arrangements. The at least three shock absorbing arrangements are evenly distributed along the circular outer perimeter of the circular shock absorbing structure. According to a second exemplary aspect of a shock absorbing structure the shock absorbing structure is square shaped and comprises at least four shock absorbing arrangements. The at least four shock absorbing arrangements are arranged at respective corner of the square shaped structure.

The number of shock absorbing arrangements for a specific shock absorbing structure may be dependent on a number of factors. Except for obvious factors such as e.g. cost, weight and required space the number of shock absorbing arrangements may be dependent on e.g. the load of the shock absorbing structure or the acceleration force the shock absorbing structure is configured to absorb. Also, the number of shock absorbing arrangements may influence the characteristic of the release from the resting position.

According to yet one exemplary aspect of the present disclosure of a shock absorbing structure the shock absorbing arrangements are encapsulated. This will protect the shock absorbing arrangement from e.g. the harsh conditions at sea.

An important advantage with the shock absorbing arrangements, and the shock absorbing structures that may be provided by implementing a number of shock absorbing arrangements, is that aspects of the shock absorbing arrangements may easily be arranged to existing structures. Thereby it is possible to provide existing structures with shock absorbing functionality. The arrangement of shock absorbing arrangements requires very little modification of existing structures can be done to a very low cost. Thus, according to one aspect of a shock absorbing structure the shock absorbing structure is configured to be retrofitted to a turntable, or to any other similar structure.

The present disclosure also refers to a radar arrangement comprising a shock absorbing structure according to any one of, or a combination of, exemplary aspects of shock absorbing structures disclosed herein and to a ship comprising such radar arrangement. A radar arrangement, and a ship, comprising an aspect of a shock absorbing structure may benefit from the same advantages as is disclosed in combination with respective exemplary aspect.

BRIEF DESCRIPTION OF THE FIGURES

With reference to the appended figures, below follows a more detailed description of exemplary embodiments of the present disclosure.

DETAILED DESCRIPTION OF VARIOUS EMBODIMENTS

The following description of example embodiments of the invention provided is presented only for purposes of illustration and should not be seen as limiting. The description is not intended to be exhaustive and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. It should be appreciated that the embodiments presented herein separately may be practiced in any combination with each other. In FIG. 2a to FIG. 4b a vertical VERT and a horizontal HOR direction is indicated by VERT and HOR arrows.

Figure 1:
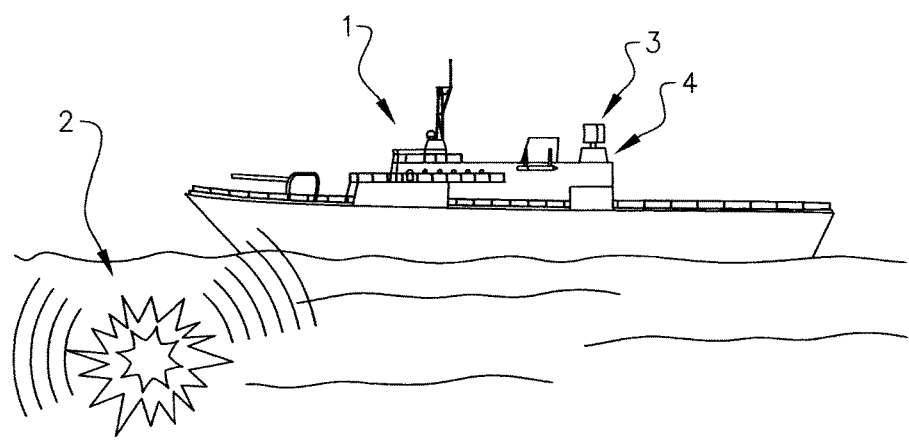
FIG. 1 discloses a schematic view of a ship exposed to a mine detonation.

FIG. 1 discloses a schematic view of a ship 3 exposed to a mine detonation 2. The ship 1 is provided with a radar arrangement 3 comprising a turntable 4. When e.g. a ship 3 is exposed to a mine detonation, or any other corresponding impact force, sensitive mechanical and/or technical equipment/devices such as e.g. a radar arrangement 3 may be damaged.

Shock absorbing arrangements of the present disclosure, which may be implemented to provide a shock absorbing structure, can advantageously be applied to protect e.g. a radar arrangement 3 from impact shock or like.

Shock absorbing arrangements and shock absorbing structures according to the present disclosure may advantageously also be used in other applications, such as e.g. land vehicles, and may also be used to protect other equipment such as e.g. lasers or sensitive measurement equipment.

Figure 2A:
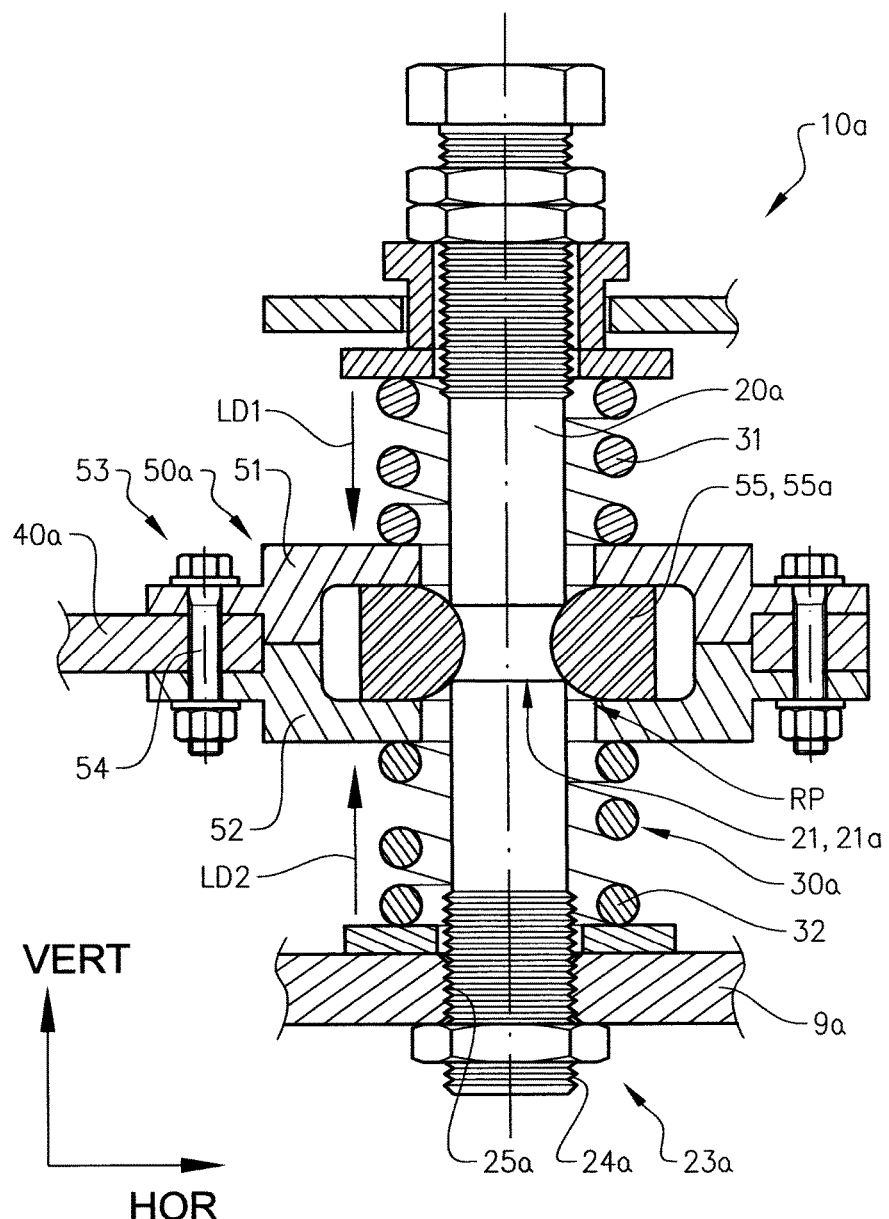
FIG. 2a discloses a second exemplary embodiment of a shock absorbing arrangement, FIG. 2b discloses a first exemplary embodiment of a shock absorbing arrangement, FIG. 3 discloses a third exemplary embodiment of a shock absorbing arrangement comprising a clearance control arrangement, FIG. 4a discloses a first schematic view of a radar arrangement comprising embodiments of shock absorbing arrangements, and FIG. 4b discloses a second schematic view of a radar arrangement comprising embodiments of shock absorbing arrangements wherein a shock absorbing arrangement is shown in cross section.

FIG. 2a discloses a first exemplary embodiment of a shock absorbing arrangement 10a. The shock absorbing arrangement 10a comprises a rod 20a and a resilient member 30a arranged in connection to the rod 20a. The shock absorbing arrangement 10a further comprises a structure element 40a and a locking member 50a, wherein the locking member 50a is arranged in connection to the structure element 40a. The exemplary embodiment of a locking member 50a disclosed in FIG. 2a comprises an upper part 51 and a lower part 52 together configured to fit to the structure element 40a. The upper and lower parts 51, 52 are arranged to the structure element 40a by means of a fastening element 53. The exemplary embodiment of fastening element 53 disclosed in FIG. 2a is in form of a screw and an interacting screw nut 54, but also other fastening elements, providing the same functionality, such as e.g. rivets, may also be used.

The locking member 50a may, if the materials used so permits, also be fastened to the structure element by e.g. suitable form of welding or gluing. In FIG. 2a the structure element 40a is shown as a metal sheet or like to which the shock absorbing arrangement 10a is arranged. It is the structure element 40a, or what is arranged to the structure element 40a, that is protected by the shock absorbing arrangement 10a disclosed herein. Thus, the configuration of the structure element, as well as how the structure element is arranged to the locking member, can be different than the example disclosed in FIG. 2a.

According to the exemplary embodiment of a shock absorbing arrangement 10a of FIG. 2a the locking member 50a is in form of a ring arranged to the structure element 40a, wherein the ring is configured to encircle the rod 20a. This will be explained more in detail, and better shown, in relation to FIG. 4a and FIG. 4b.

The locking member 50a is arranged to detachably lock the structure element 40a at a resting position RP at the rod 20a. This is provided by that the locking member 50a comprises at least two parts, a first locking member part 21 and a second locking member part 55, which when being exposed to a specific force may be released from one another. Thus, the first and second locking member parts 21, 55 are configured to detachably lock to one another when not being exposed to external forces, or when being exposed to forces lower than the predetermined holding force, and to release from one another when being exposed to a force acting to separate the first locking member part 21 from the second locking member part 55 and exceeding the predetermined holding force.

For the exemplary locking member 50a disclosed in FIG. 2a the second locking member part 55 comprises a locking protrusion 55a which is adapted according to the first locking member part 21 comprising a locking groove 21a. The rod 20a is provided with the locking groove 21a and the structure element 40a is provided with the locking protrusion 55a via the locking member 50a arranged to the structure element 40a. The locking protrusion 55a is configured to fit in the locking groove 21a. The configuration of the locking protrusion 55a and of the locking groove 21a determines the interaction between the locking protrusion 55a and the locking groove 21a. The interaction determines the holding force provided by the locking member 50a for maintaining the structure element 40a, via the locking member 50a, at the resting position RP at the rod 20a. The locking protrusion 55a is preferably made of a resilient material.

As previously mentioned, at least a part of the locking member 50a is additionally supported by the resilient member 30a, wherein the resilient member 30a is configured such that a spring force of the resilient member 30a also acts to maintain the structure element 40a, via the locking member 50a which is arranged to the structure element 40a, essentially at the resting position RP at the rod 20a.

The locking member 50a is configured to release the structure element 40a from the resting position RP when being exposed to a force exceeding a predetermined holding force. According to the exemplary embodiment of the present disclosure disclosed in FIG. 2a this functionality is obtained by that the locking protrusion 55a is released from the locking groove 21a. When the structure element 40a, or any structure of functionality arranged to the structure element 40a, is exposed to an acceleration force or impact shock e.g. due to a mine detonation, that force propagates via the structure element 40a to the locking member 50a. If the force propagated to the locking member 50a exceeds this predetermined holing force the locking member 50a releases. As the locking member 50a releases the locking protrusion 55a is displaced, in the direction of the rod 20a, in relation to the locking groove 21a. The resilient member 30a supporting the structure element 40a and/or the locking member 50a will counteract the movements of the locking protrusion 55a and the structure element 40a in relation to the locking groove 21a and will also act to reinstate the locking protrusion 55a at the looking groove 21a wherein the structure element 40a is reinstated at the resting position RP at the rod 20a.

In the exemplary embodiment of the present disclosure disclosed in FIG. 2a also the locking protrusion 55a is in form of a ring and the locking groove 21a is in form of a circumferential groove. Thereby the ring shaped locking protrusion 55a of the locking member 50a is configured to interact with the circumferential locking groove 21a all around the rod 20a.

What is disclosed in FIG. 2a is just one example of how a locking member may be configured. Also other configurations of e.g. locking protrusions and interacting locking grooves are possible as well as other designs of locking members that provide the same functionality. In the exemplary embodiment of the disclosure disclosed in FIG. 2a the locking groove 55a, which actually is a part of the rod 20a, is considered to be a part of the locking member 50a. As will be shown in relation to FIG. 2a the locking groove, or corresponding, may also be a separate part, not part of the rod 20a. What is important is that the locking member comprises at least two parts, which may be parts of e.g. the structure element or the rod, which when exposed to a force may be released from one another. Thus, it is also considered to be within the scope of the present invention that according to another, not shown, embodiment of a locking member the structure element may form or be arranged to a part of the locking member forming a groove or like and the rod may form or be arranged to a part of the locking member forming a protrusion or like interacting with that groove. Also other possible locking member configurations providing the same functionality as the exemplary locking member 50a disclosed in relation to FIG. 2a is considered to be within the scope of the present disclosure. For further clarification, for embodiments of the present disclosure where the locking member is supported by the resilient member it is preferably just one part of locking member that is supported by the resilient member.

Additionally, according to the exemplary embodiment of a shock absorbing arrangement 10a of the present disclosure the resilient member 30a comprises a first resilient sub-member 31 and a second resilient sub-member 32, wherein the first resilient sub-member 31 is configured to exert a spring force on the locking member 50a in a first longitudinal direction LD1 of the rod 20a and the second resilient sub-member 32 is configured to exert a spring force on the locking member 50a in a second longitudinal direction LD2 of the rod 20a. The first longitudinal direction LD1 of the rod 20a is directed essentially opposite the second longitudinal direction LD2 of the rod 20a. Further, the rod 20a extends through the first and second resilient sub-members 31, 32 and through the locking member 50a, wherein the first resilient sub-member 31 is arranged on a first side of the locking member 50a and the second resilient sub-member 32 is arranged on a second side of the locking member 50a.

In FIG. 2a the resilient member 30a, and thereby the first and second resilient sub-members 31, 32, is disclosed as coil springs. The coil spring may be arranged either freely around the rod 20a, wherein they will only be able to exert a spring force in one direction, or be fixedly arranged to respective adjacent surfaces the springs are supporting, wherein is will be able to exert a spring force in both directions of the rod 20a. Other possible types of springs that may be used in order to provide the resilient functionality of the resilient member are tension springs and leaf springs.

According to other embodiments of the present disclosure the resilient member comprises just one coil spring, wherein that coil spring is fixedly arranged to and extends through the locking member and/or the structure element.

Further, in the exemplary embodiment disclosed in FIG. 2a a first end of the rod 23a is provided with a screw threading 24a. The screw threading 24a is configured such when the shock absorbing arrangement 10a is mounted at a structure 9a the screw threading 24a interacts with a corresponding screw threading receiver 25a of the structure 9a. By means of screwing the screw threading 24a of the rod 20a into the screw threading receiver 25a of the structure 9a the vertical position of the locking groove 21a, if referring to the vertical VERT and horizontal HOR directions indicated in FIG. 2a, of the rod 20a in relation to the structure 9a is adjustable. Thereby the vertical position of the resting position RP can be adjusted.

Figure 2B:
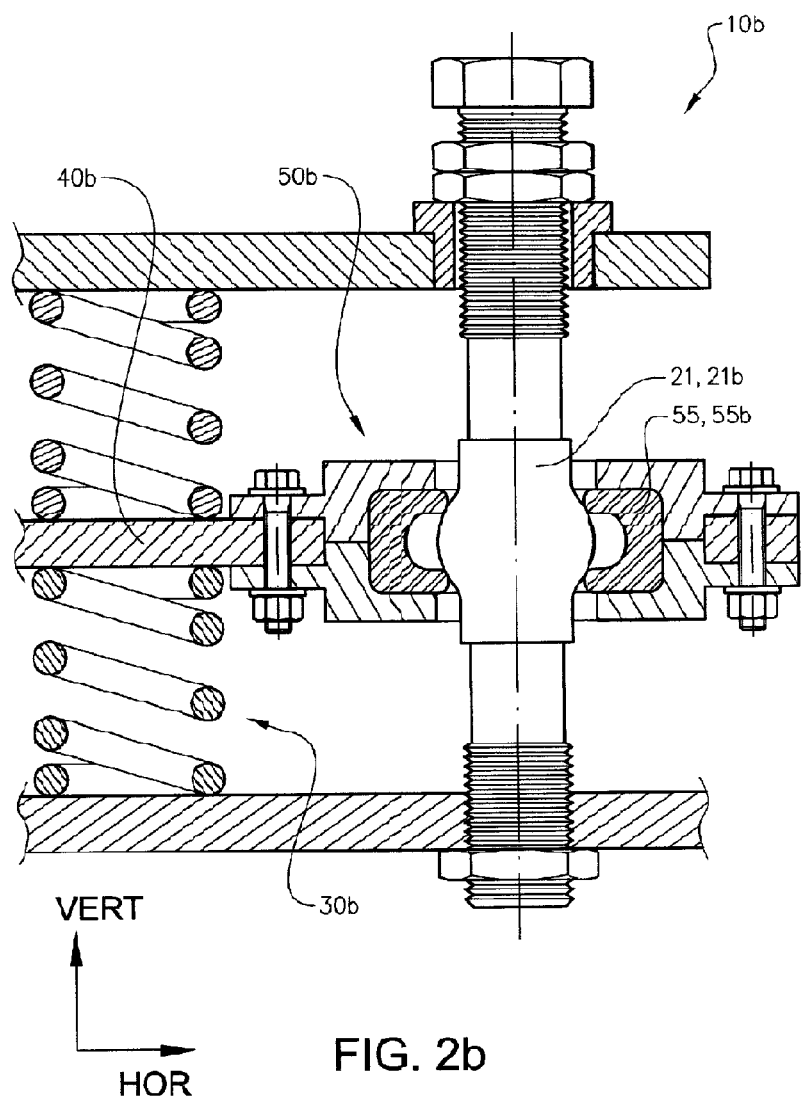

FIG. 2b discloses a second exemplary embodiment of a shock absorbing arrangement 10b. The second exemplary embodiment of a shock absorbing arrangement 10b is in most embodiments similar to the exemplary embodiment of FIG. 2a, but a number of features are configured differently without departing from the scope of the present disclosure.

In the exemplary embodiment of the present disclosure disclosed in FIG. 2b the resilient member 30b is arranged to support the structure element 40b, instead of the locking member 50b. The effect of this difference is, in most aspects, negligible. An advantage with having the resilient member 50a as is disclosed in FIG. 2a may be that the forces exerted by the resilient member 50a will be directed in the longitudinal direction of the rod 20a. An advantage with having the resilient member 50b as is disclosed in FIG. 2b may be that it may be easier to replace the resilient member 50b. I embodiments where the resilient member 30b is not arranged around the rod 20a the resilient member 30b preferably consists of one spring, such as a coil spring, extending through the structure element 40b.

Additionally the locking member 50b of the exemplary embodiment of a shock absorbing arrangement 10b disclosed in FIG. 2b is configured differently. According to the embodiment disclosed in FIG. 2b the first locking member part 21 comprises a locking member sleeve 21b and the second locking member 55 comprises a locking member pad 55b. A locking member sleeve protrusion 22 of the locking member sleeve 21b interacts with a locking member pad indentation 56 of the locking member pad 21b in accordance with what has been previously disclosed in relation to the interaction of the locking protrusion 55a and the locking groove 21a. For the exemplary embodiment disclosed in FIG. 2b the locking member pad 21b is preferably made of a resilient material, but it is also possible that also, or instead, the locking member sleeve 55b is made of a resilient material. Thus, as is apparent for a person skilled in the art the first locking member 21 and the second locking member 55 may be configured in many different ways but still providing the same functionality.

The second exemplary embodiment of a shock absorbing arrangement 10b is provided to highlight that there are a number of variations of the present disclosure and modifications of the present disclosure that may be done without departing from the inventive concept of the present disclosure.

Figure 3:
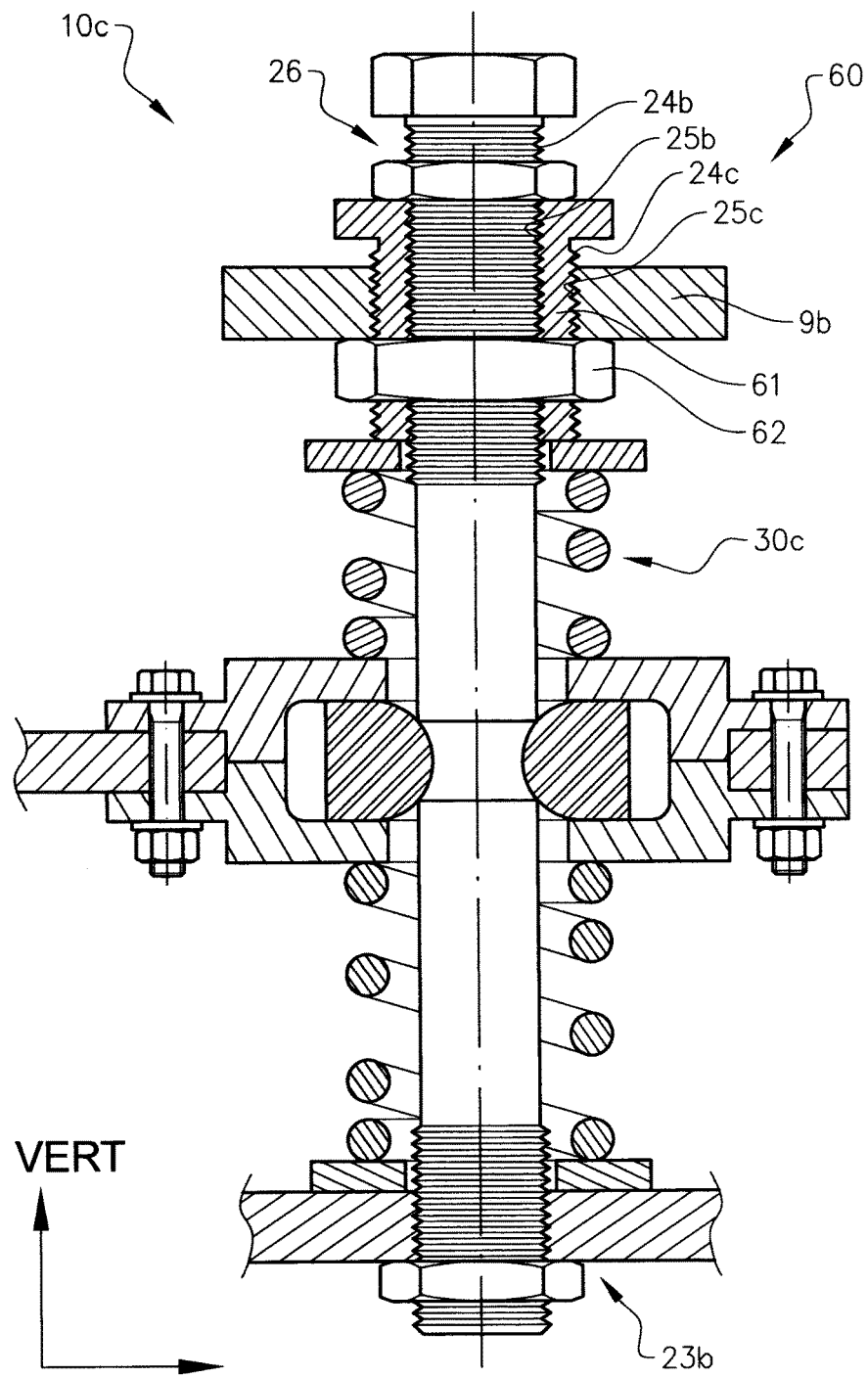

FIG. 3 discloses a third exemplary embodiment of a shock absorbing arrangement 10c comprising a clearance control arrangement 60. In the exemplary embodiment disclosed in FIG. 3 also a second end of the rod 26 is provided with a screw threading 24b. The clearance control arrangement 60 comprises a sleeve screw 61 and an interacting sleeve screw nut 62. The sleeve screw 61 is both inwardly threaded with a screw threading 25b towards the screw threading 24b of the second end of the rod 26 and outwardly threaded with a screw threading 24c towards a screw threaded receiver 25c of the surrounding structure 9b. The sleeve screw nut 62 is configured according to the outer screw threading 24c of the screw sleeve 61. By controlling to what extent the sleeve screw 61 is screwed onto the threaded, second end of the rod 26, to what extent the sleeve screw 61 is screwed into the screw threading receiver 25c of the surrounding structure 9b and to what extent the sleeve screw nut 62 is screwed onto the sleeve screw 61 the clearance and/or preloaded of the resilient member 30c can be controlled. The clearance control arrangement has the advantage that it is possible to control that there is no play between the resilient member and the surfaces the resilient member supports. By controlling the spring tension of the resilient member it may also be possible to influence the properties of the resilient member.

It should be noted that the embodiment disclosed in FIG. 3 comprises both the clearance control arrangement 60 at the second end of the rod 26 and a screw treading 24a at the first end of the rod 23b. However, according to other embodiments of shock absorbing arrangements a clearance control arrangement at a second end of the rod may be present without having any screw treading at a first end of the rod.

Figure 4A:
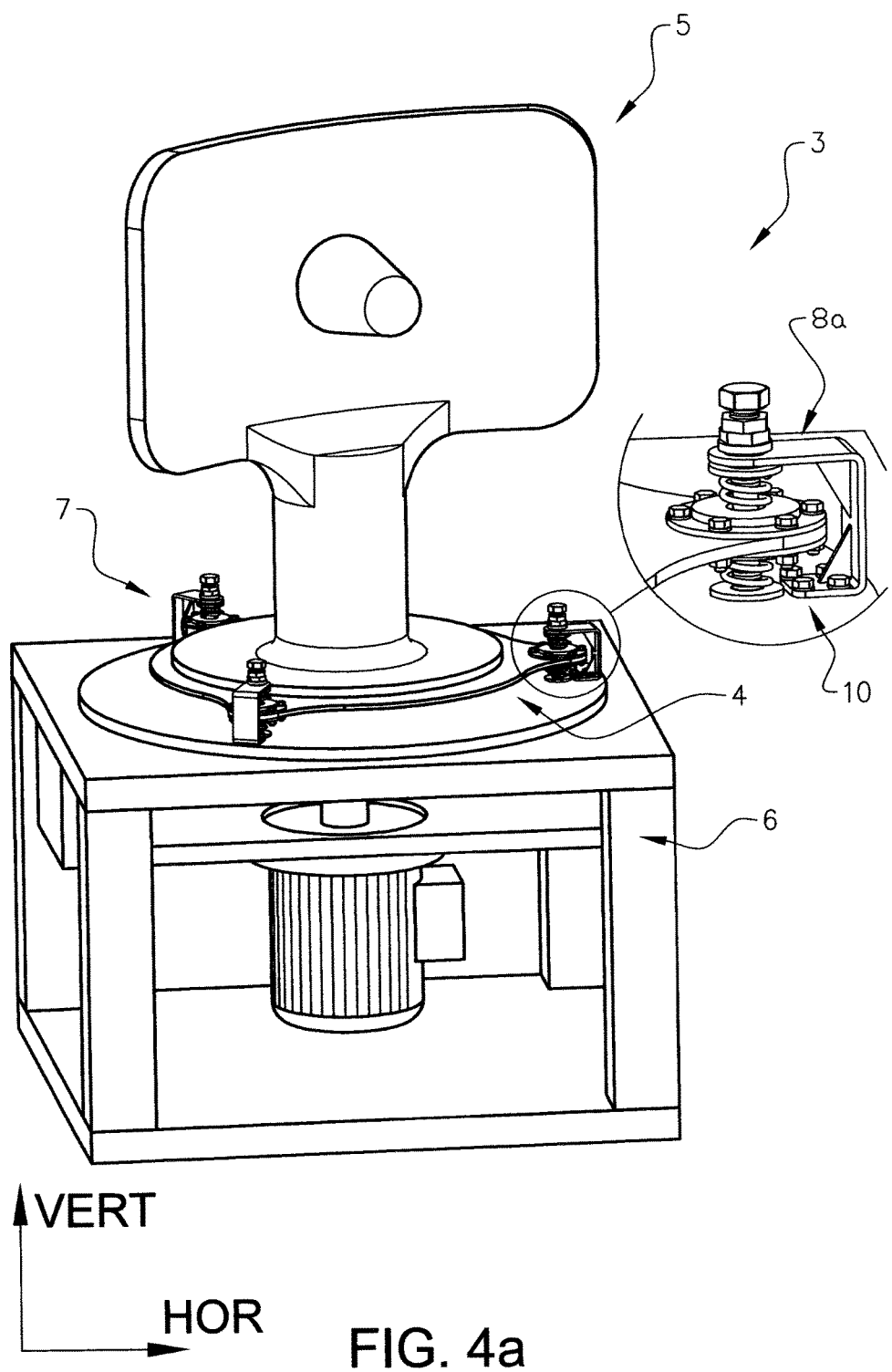

FIG. 4a discloses a schematic view of a radar arrangement 3 comprising a shock absorbing structure 7, in turn comprising shock absorbing arrangements 10, arranging a turntable 4 of a radar antenna 5 to a radar rack 6. According to the exemplary embodiment the shock absorbing structure 7 comprises three shock absorbing arrangements 10. Other embodiments of shock absorbing structures may however comprise a larger number of shock absorbing arrangements. The number of shock absorbing arrangements may e.g. be dependent on cost, weight, required space and the load of the shock absorbing structure, or the acceleration force the shock absorbing structure is configured to absorb. Also, the number of shock absorbing arrangements may influence the characteristic of the release from the resting position. The three shock absorbing arrangements 10 are evenly distributed along the circular outer perimeter of the turntable.

Further, respective shock absorbing arrangement 10 is supported by a holder 8a. The holders 8a are amongst others provided to withstand forces incurred in horizontal direction HOR, thus forces acting on respective shock absorbing arrangement 10 in a direction perpendicular to the rod of respective shock absorbing arrangement 10. FIG. 4a discloses one embodiment of holders 8a, but as is apparent for a person skilled in the art the holders may be configured in various different ways still providing the same functionality.

The configuration and design of the holders may e.g. be dependent on in which application the shock absorbing arrangements are implemented and the forces the holders must be able to withstand. The holders may also be an integrated part of an enclosure of the shock absorbing arrangements, the turntable or the shock absorbing structure.

Figure 4B:
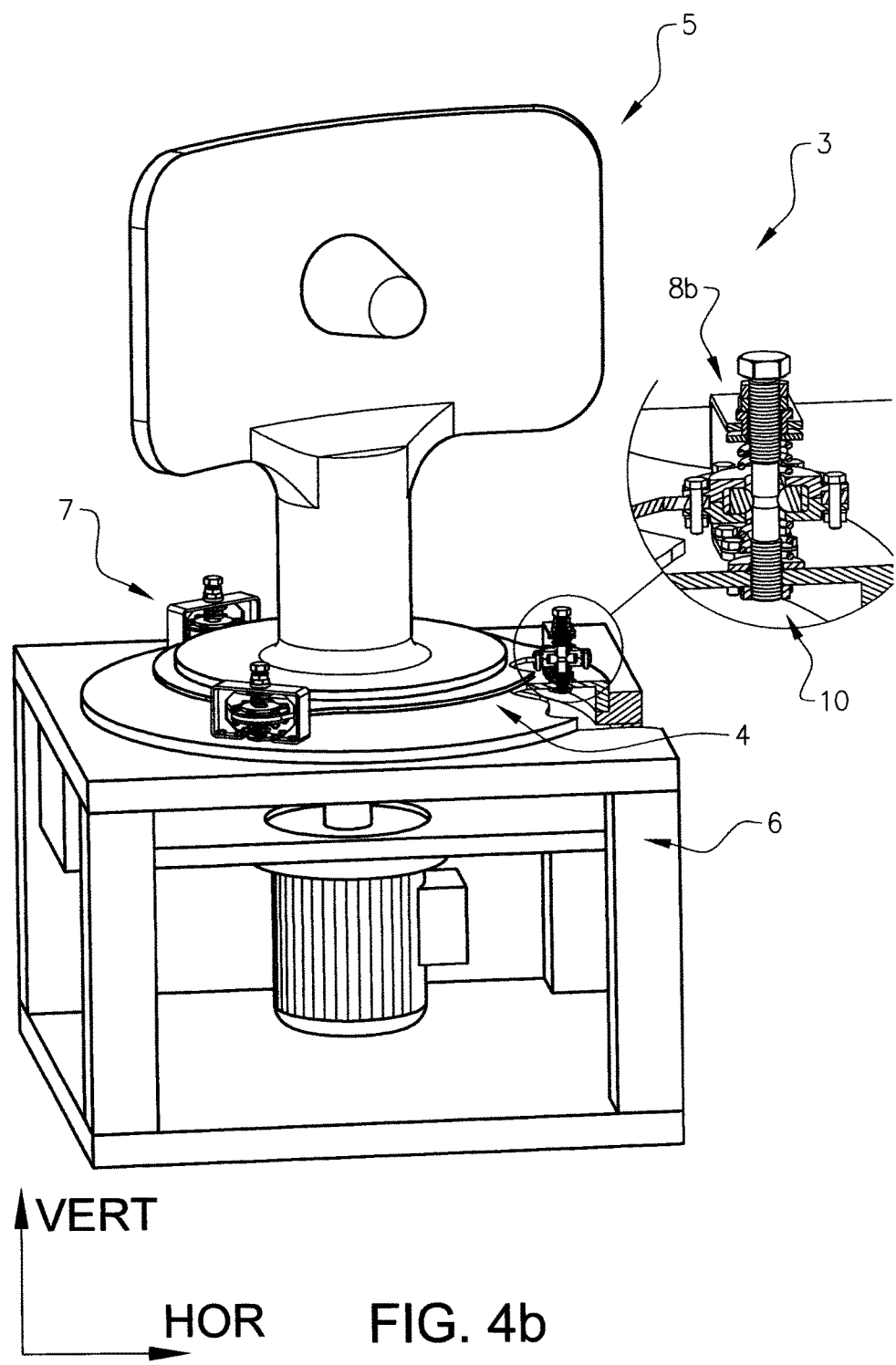

FIG. 4b also discloses a schematic view of a radar arrangement 3 comprising embodiments of shock absorbing arrangements 10, wherein for clarification purposes one shock absorbing arrangement 10 is shown in cross section. In FIG. 4b another embodiment of holders 8b is disclosed than in FIG. 4a. The number of holders 8b is the same as the number of shock absorbing arrangements 10.

When herein using reference numbers indexed with a letter what is referred to is an exemplary embodiment of a feature that may be configured differently according to the present disclosure. Thus, e.g. 10 refers to shock absorbing arrangements according to the present disclosure whereas 10a, 10b and 10c refers to various exemplary embodiments of shock absorbing arrangements according to the present disclosure.

The invention claimed is:

1. A shock absorbing arrangement (10) for ship installed structures, the arrangement comprising:
   a rod (20),
   a resilient member (30) arranged in connection to the rod (20),
   a structure element (40), and
   a locking member (50) arranged in connection to the structure element (40),
   wherein:
      the locking member (50) is arranged to detachably lock the structure element (40) at a resting position (RP) at the rod (20),
      a part of the locking member (50) or the structure element (40) is supported by the resilient member (30), wherein the resilient member (30) is configured such that a spring force of the resilient member (30) acts to maintain the structure element (40) essentially at the resting position (RP) at the rod (20),
      the locking member (50) provides a predetermined holding force for maintaining the structure element (40) at the resting position (RP) and is configured to release the structure element (40) from the resting position (RP) when being exposed to a force exceeding the predetermined holding force, whereupon the resilient member (30) acts to reinstate the locking of the structure element (40) at the resting position (RP) at the rod (20),
      the locking member (50) comprises a first locking member part (21) and a second locking member part (55), wherein the first and second locking member parts (21, 55) are configured to detachably lock to one another and to release from one another when being exposed to a force acting to separate the first locking member part (21) from the second locking member part (55) and exceeding the predetermined holding force,
      the first locking member part (21) comprises a locking groove (21a) and the second locking member part (55) comprises a locking protrusion (55a),
      the rod (20a) is provided with the locking groove (21a) and the structure element (40a) is provided with the locking protrusion (55a),
      the locking protrusion (55a) is adapted according to the locking groove (21a),
      the locking protrusion (55a) is configured to fit in the locking groove (21a), and
      the configuration of the locking protrusion (55a) and of the locking groove (21a) determines the interaction between the locking protrusion (55a) and the locking groove (21a) whereby the interaction determines the holding force provided by the locking member (50a).

2. The shock absorbing arrangement (10a) according to claim 1, wherein:

the resilient member (30) comprises a first and a second resilient sub-member (31, 32), the first resilient sub-member (31) is configured to exert a spring force on the locking member (50a) or structure element (40a) in a first longitudinal direction (LD1) of the rod (20a), the second resilient sub-member (32) is configured to exert a spring force on the locking member (50a) or structure element (40a) in a second longitudinal direction of the rod (LD2), and the first longitudinal direction (LD1) of the rod (20a) is directed essentially opposite the second longitudinal direction (LD2) of the rod (20a).

3. The shock absorbing arrangement (10a) according to claim 1, wherein at least one of the first and second locking member parts (21, 55) is made of a resilient material.

4. The shock absorbing arrangement (10a) according to claim 1, wherein the shock absorbing arrangement (10c) additionally comprises a clearance control arrangement (60).

5. The shock absorbing arrangement (10a) according to claim 1, wherein at least one resilient member (50) is in form of a coil spring, a tension spring or a leaf spring.

6. The shock absorbing arrangement (10a) according to claim 1, wherein the structure element (40) is a portion of a turntable (4).

7. A shock absorbing structure (7), wherein the shock absorbing structure (7) has a circular outer perimeter and comprises at least three shock absorbing arrangements (10) according to claim 1, wherein the at least three shock absorbing arrangements (10) are evenly distributed along the circular outer perimeter of the circular structure (7).

8. A shock absorbing structure, wherein the shock absorbing structure is square shaped and comprises at least four shock absorbing arrangements according to claim 1, wherein the at least four shock absorbing arrangements are arranged at respective corners of the square shaped structure.

9. The shock absorbing structure (7) according to claim 7, wherein the shock absorbing arrangements (10) are encapsulated.

10. The shock absorbing structure (7) according to claim 7, wherein the shock absorbing structure (7) is configured to be retrofitted to a turntable (4).

11. A radar arrangement (3) comprising the shock absorbing structure (7) according to claim 7.

12. A ship (1) comprising the radar arrangement (3) according to claim 11.

13. A shock absorbing arrangement (10) for ship installed structures, the arrangement comprising:
a rod (20),
a resilient member (30) arranged in connection to the rod (20),
a structure element (40), and
a locking member (50) arranged in connection to the structure element (40),
wherein:
the locking member (50) is arranged to detachably lock the structure element (40) at a resting position (RP) at the rod (20),
a part of the locking member (50) or the structure element (40) is supported by the resilient member (30), wherein the resilient member (30) is configured such that a spring force of the resilient member (30) acts to maintain the structure element (40) essentially at the resting position (RP) at the rod (20),
the locking member (50) provides a predetermined holding force for maintaining the structure element (40) at the resting position (RP) and is configured to release the structure element (40) from the resting position (RP) when being exposed to a force exceeding the predetermined holding force, whereupon the resilient member (30) acts to reinstate the locking of the structure element (40) at the resting position (RP) at the rod (20),
the locking member (50) comprises a first locking member part (21) and a second locking member part (55), wherein the first and second locking member parts (21, 55) are configured to detachably lock to one another and to release from one another when being exposed to a force acting to separate the first locking member part (21) from the second locking member part (55) and exceeding the predetermined holding force,
the resilient member (30) comprises a first and a second resilient sub-member (31, 32),
the first resilient sub-member (31) is configured to exert a spring force on the locking member (50a) or structure element (40a) in a first longitudinal direction (LD1) of the rod (20a),
the second resilient sub-member (32) is configured to exert a spring force on the locking member (50a) or structure element (40a) in a second longitudinal direction of the rod (LD2), and
the first longitudinal direction (LD1) of the rod (20a) is directed essentially opposite the second longitudinal direction (LD2) of the rod (20a).

14. The shock absorbing arrangement (10a) according to claim 13, wherein at least one of:
at least one of the first and second locking member parts (21, 55) is made of a resilient material; or
at least one resilient member (50) is in form of a coil spring, a tension spring or a leaf spring.

15. The shock absorbing arrangement (10a) according to claim 13, wherein the shock absorbing arrangement (10c) additionally comprises a clearance control arrangement (60).

16. The shock absorbing arrangement (10a) according to claim 13, wherein the structure element (40) is a portion of a turntable (4).

17. A shock absorbing arrangement (10) for ship installed structures, the arrangement comprising:
a rod (20),
a resilient member (30) arranged in connection to the rod (20),
a structure element (40), and
a locking member (50) arranged in connection to the structure element (40),
wherein:
the locking member (50) is arranged to detachably lock the structure element (40) at a resting position (RP) at the rod (20),
a part of the locking member (50) or the structure element (40) is supported by the resilient member (30), wherein the resilient member (30) is configured such that a spring force of the resilient member (30) acts to maintain the structure element (40) essentially at the resting position (RP) at the rod (20),
the locking member (50) provides a predetermined holding force for maintaining the structure element (40) at the resting position (RP) and is configured to release the structure element (40) from the resting position (RP) when being exposed to a force exceeding the predetermined holding force, whereupon the resilient member (30) acts to reinstate the locking of the structure element (40) at the resting position (RP) at the rod (20), the locking member (50) comprises a first locking member part (21) and a second locking member part (55), wherein the first and second locking member parts (21, 55) are configured to detachably lock to one another and to release from one another when being exposed to a force acting to separate the first locking member part (21) from the second locking member part (55) and exceeding the predetermined holding force, the first locking member part (21) comprises a locking groove (21*a*) and the second locking member part (55) comprises a locking protrusion (55*a*), the rod (20*a*) is provided with the locking groove (21*a*) and the structure element (40*a*) is provided with the locking protrusion (55*a*), the locking protrusion (55*a*) is adapted according to the locking groove (21*a*), the locking protrusion (55*a*) is configured to fit in the locking groove (21*a*), and the configuration of the locking protrusion (55*a*) and of the locking groove (21*a*) determines the interaction between the locking protrusion (55*a*) and the locking groove (21*a*) whereby the interaction determines the holding force provided by the locking member (50*a*), at least one end of the rod (20*a*) is provided with a screw threading (24*a*), and the screw threading (24*a*) is configured such when the shock absorbing arrangement (10*a*) is mounted at a structure (9) the screw threading (24*a*) interacts with a corresponding screw threading receiver (25*a*) of the structure (9), whereby by means of screwing the screw threading (24*a*) of the rod (20*a*) into the screw threading receiver (25*a*) the position of the locking groove (21*a*) of the rod (20*a*) in relation to the structure (9) is adjustable.

18. The shock absorbing arrangement (10*a*) according to claim 17, wherein the shock absorbing arrangement (10*c*) additionally comprises a clearance control arrangement (60).

19. A shock absorbing structure (7), wherein:

the shock absorbing structure (7) has a circular outer perimeter and comprises at least three shock absorbing arrangements (10) according to claim 17, the at least three shock absorbing arrangements (10) are evenly distributed along the circular outer perimeter of the circular structure (7), and at least one of:
the shock absorbing arrangements (10) are encapsulated; or
the shock absorbing structure (7) is configured to be retrofitted to a turntable (4).

20. A shock absorbing structure, wherein the shock absorbing structure is square shaped and comprises at least four shock absorbing arrangements according to claim 17, wherein the at least four shock absorbing arrangements are arranged at respective corners of the square shaped structure.

* * * * *